(12) United States Patent
Fox et al.

(10) Patent No.: US 7,828,867 B2
(45) Date of Patent: Nov. 9, 2010

(54) FILTER RETAINER MECHANISM FOR A PORTABLE AIR TREATMENT SYSTEM

(75) Inventors: Andy Fox, Oakdale, MN (US); Ronald C. Johansson, Stillwater, MN (US); Kevin E. Kinzer, Cottage Grove, MN (US); Glendon D. Kappel, Eagan, MN (US); Casey L. Carlson, Edina, MN (US); Paula A. Marrs, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 690 days.

(21) Appl. No.: 11/361,017

(22) Filed: Feb. 22, 2006

(65) Prior Publication Data

US 2007/0193234 A1 Aug. 23, 2007

(51) Int. Cl.
*B01D 19/00* (2006.01)
(52) U.S. Cl. .............................. 55/471; 55/472; 55/495; 55/497; 55/500; 55/502; 55/507; 55/509; 55/511; 95/273; 95/287
(58) Field of Classification Search .................. 55/471, 55/472, 495, 497, 500, 502, 507, 509, 511; 95/273, 287
See application file for complete search history.

(56) References Cited

U.S. PATENT DOCUMENTS

| | | |
|---|---|---|
| 3,407,936 A | 10/1968 | Balogh |
| 4,701,195 A | 10/1987 | Rosendall |
| 5,525,136 A | 6/1996 | Roson |
| 5,762,667 A | 6/1998 | Pippel et al. |
| 5,840,092 A | 11/1998 | Rick et al. |
| 6,174,340 B1 | 1/2001 | Hodge |
| 6,284,011 B1 | 9/2001 | Chiang et al. |
| 6,494,940 B1 | 12/2002 | Hak |
| 6,716,267 B2 | 4/2004 | Lawlor, Sr. |
| 6,863,704 B2 | 3/2005 | Pillion et al. |
| 2002/0174632 A1* | 11/2002 | Chiang et al. .................. 55/418 |
| 2003/0177745 A1* | 9/2003 | Jauw ............................ 55/497 |
| 2005/0050867 A1 | 3/2005 | Taomo et al. |

* cited by examiner

*Primary Examiner*—Jason M Greene
*Assistant Examiner*—Dung Bui
(74) *Attorney, Agent, or Firm*—David B. Patchett (57) ABSTRACT

A portable air treatment device and system including a filter retaining mechanism for selectively retaining a replaceable filter assembly. The filter retaining mechanism includes a rigid, non-moveable body that reduces a size of an access opening to a filter chamber otherwise formed by the air treatment device housing, along with a bearing surface. The rigid body serves as a catch or latch, preventing unexpected dislodgement of a filter assembly from the chamber. The bearing surface is also rigid and non-moveable, and provides a means for easily inserting and removing a primarily non-permanently deflectable filter assembly about the rigid body.

30 Claims, 11 Drawing Sheets

FILTER RETAINER MECHANISM FOR A PORTABLE AIR TREATMENT SYSTEM

BACKGROUND

The present invention relates generally to air treatment systems, such as room air purifiers. More particularly, it relates to mechanisms for retaining a removable filter within a portable air treatment device housing, and methods of inserting a filter into, and removing the filter from, a portable air treatment device housing.

Various portable air treatment systems are available for use in filtering or otherwise treating air in closed environments. These air treatment systems can assume a variety of forms, and generally include a housing maintaining a blower or fan, along with a filter. The blower directs room air through the filter to remove various contaminants, such as particles, dust, pollen, odors, etc. The treated air is then directed back into the environment in which the system is located. The system may be designed to perform other functions (e.g., a dehumidifier), but typically provides a user with the ability to remove and replace the filter. With this approach, then, regardless of an exact form of the filter (e.g., HEPA filters, multi-layered filters, pleated filters, etc.), upon partial or full saturation or loading of the filter with room air contaminants, the used filter is simply replaced with a new filter, thus extending an overall useful life of the air treatment system. This cost effective approach is highly desired by consumers.

In light of the above consumer expectations, efforts have been made to devise mechanisms for retaining an otherwise removable filter within the air treatment device's housing. Ease of consumer handling is normally a desired attribute, along with ensuring that once assembled within the housing, the filter will not easily be displaced. Most filters useful with portable air treatment systems are relatively flat. As such, where the air treatment device is designed such that the filter is maintained horizontally, mechanisms for releasably retaining the filter can be fairly simplistic. For example, a horizontally-oriented filter loaded through a top of the unit's housing can simply be placed against a flat surface, with gravity acting to keep the filter in place. However, this orientation may not be conducive to a compact overall design capable of achieving a desired incoming/outgoing airflow pattern, and thus many portable air treatment systems position the filter in an upright or nearly upright fashion.

For upright (or nearly upright) applications, a more robust retaining mechanism capable of capturing the filter is a virtual requirement. For example, where a movable panel or door is the only structure holding the filter in place, once the panel/door is opened, the filter may naturally fall out of the housing. If the filter is loaded or saturated with contaminants/particles, this occurrence is highly undesirable as the contaminated filter will fall on to the user's floor, in turn causing particles retained by the filter to become dislodged and soil the contacted surface. As a result, various, oftentimes complex, retaining mechanisms for upright (or nearly upright) filters orientations have been suggested. These include, for example, metal or plastic springs, rotating latches or catches, etc. While these mechanical solutions are viable, they may entail certain long term complications (e.g., a movable latch acts as a lever and typically concentrates stresses at the base thereof, perhaps leading to failure with repeated use), and represent an added expense. Conversely, the system may be configured to rely upon a solid friction fit or a moveable friction fit between the filter and the housing. A solid friction fit (e.g., a cardboard-framed filter in a solid plastic housing opening) requires that the filter be manufactured to a very tight size tolerance; this, in turn, increases costs and may not be consistently achieved. Similarly, the moveable friction fit approach (e.g., a foam or rubber gasket that is applied to and/or moves with a perimeter of the filter) is again characterized by additional parts and/or expense. Additionally, the frictional fit may interfere with achieving a desired air seal against the filter frame during use.

Current techniques for removably retaining a filter within a portable air treatment system housing are less than optimal. Therefore, a need exists for filter retaining mechanisms that are inexpensive, easy to manufacture, and easy to use.

SUMMARY

Principles of the present invention overcome the above-identified limitations in the field by providing a portable air treatment device that removably retains a filter with no moving parts. The air treatment device, and related method of using the same when loading/unloading a filter, adds minimal expense to the device housing and the filter itself. In addition, a filter can easily be loaded and unloaded, and robust capturing of the filter is achieved.

Aspects in accordance with principles of the present invention relate to a portable air treatment device including a blower, a housing, and a filter retaining mechanism. The housing maintains the blower and forms a filter chamber. The filter chamber is fluidly open to the blower and is generally defined by an access end and a back end (opposite the access end). The filter chamber is sized to selectively receive a filter assembly, and is defined at least in part by framework and a flange. The framework extends from the access end to the back end so as to define a maximum height and width of the filter chamber. The flange projects inwardly relative to the framework at the back end to form a filter receiving surface against which a filter assembly can be placed. With this in mind, the filter retaining mechanism is provided to capture a filter assembly within the filter chamber and includes a rigid, non-moveable first body and a non-moveable bearing surface. In one embodiment, the bearing surface is provided as part of the body, whereas in other embodiments, the bearing surface is provided as part of a second body. Regardless, the first body is associated with the framework, extending inwardly relative to the frame at a point spaced from the back end of the filter chamber. To this end, the body extends to a terminal edge that combines with the framework to define a chamber access opening. The chamber access opening is of a reduced effective height and/or width area as compared to the maximum height and width defined by the framework alone. With this configuration, a filter assembly can be captured between the body and the flange. The bearing surface is configured and positioned relative to the body to facilitate passage of the filter assembly over or beyond the terminal edge. For example, in one embodiment, a filter assembly can be forced against the bearing surface, with this interaction causing or promoting deflection of the filter assembly at the first body such that the filter assembly can move over or beyond the terminal edge thereof.

Other aspects in accordance with the present invention relate to a method of manipulating a filter assembly relative to a portable air treatment device having a filter chamber and a filter retaining mechanism having a first body that reduces at least one of a height and width of an access opening to the filter chamber. The method includes positioning a border segment of the filter assembly adjacent the first body (outside of the filter chamber) and applying a force to the filter assembly to cause a primarily non-permanent deflection of the filter assembly sufficient to permit clearance of the border segment about the first body. The filter assembly is inserted, in this deflected state, into the filter chamber and the force removed. Upon removal of the force, the filter assembly transitions from the deflected state, reverting to a height or width that is greater than the corresponding access opening height or width. As a result, the filter assembly is captured within the filter chamber.

Other aspects of the present invention relate to a portable air treatment system including a filter assembly and an air treatment device. The filter assembly has a height and width. The air treatment device forms a filter chamber having an access end. A filter retaining mechanism associated with the filter chamber creates a chamber access opening having an effective height and width that is less than at least one of a maximum height and width of the filter chamber. The filter height and width are less than the maximum height and width of the filter chamber, and at least one of the filter height and width is greater than a corresponding one of the access opening effective height and width. Finally, the system is configured such that the filter assembly can be manipulated relative to the filter chamber by causing a primarily non-permanent deflection of the filter assembly to occur, sufficient to provide clearance about a corresponding portion of the filter retaining mechanism.

DETAILED DESCRIPTION

Figure 1:
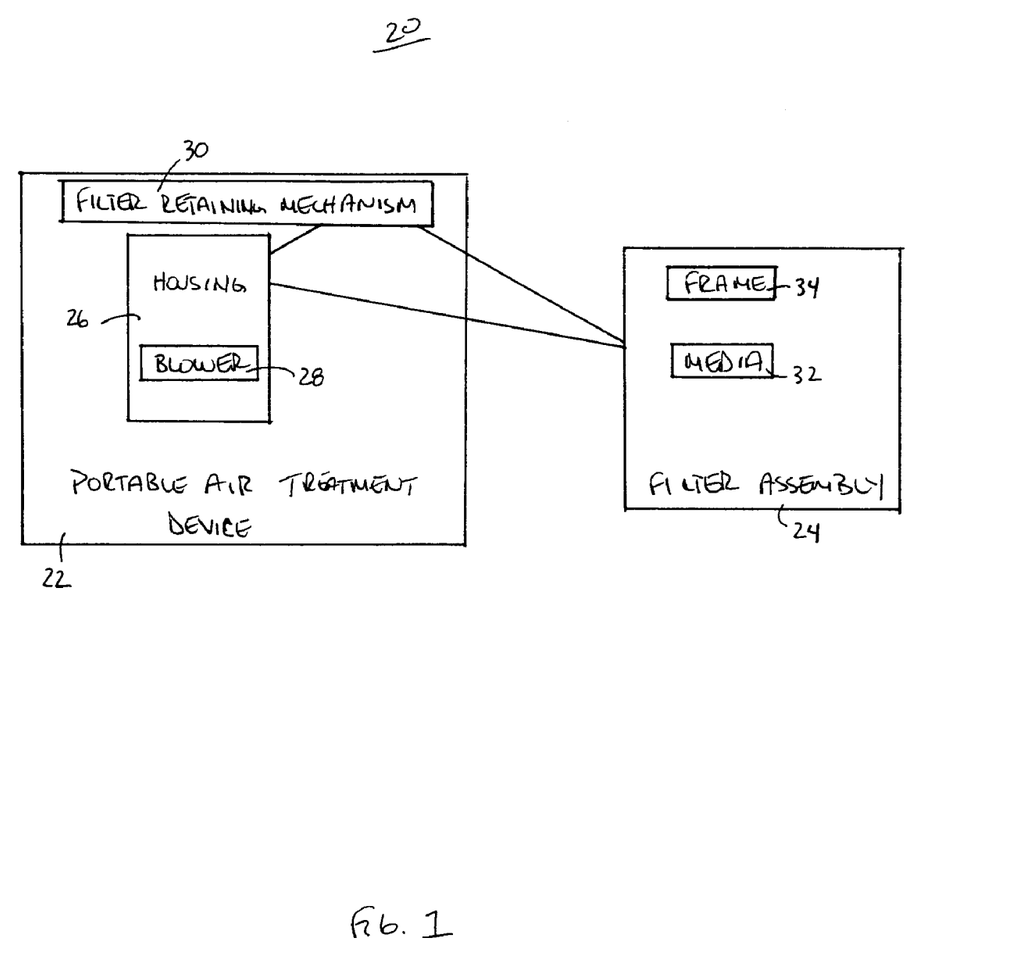
FIG. 1 is a block diagram of a portable air treatment system in accordance with principles of the present invention.

Aspects of the present invention relate to a portable air treatment system, and in particular a mechanism and related method for retaining a filter assembly relative to an air treatment device housing thereof. With this in mind, FIG. 1 illustrates, in block form, a portable air treatment system 20 with which the present invention is useful, the system 20 including a portable air treatment device 22 and a filter assembly 24. The air treatment device 22 generally includes a housing or cabinet 26, a blower or fan 28, and a filter retaining mechanism 30. The filter assembly 24 includes a filter media 32 and a filter frame 34. Details on the various components are provided below. In general terms, however, the housing 26 contains the blower 28 and otherwise establishes a filter chamber (not shown) for selectively receiving the filter assembly 24. The filter retaining mechanism 30 is associated with the housing 26, and in particular the chamber formed thereby, and serves to capture the filter assembly 24 within the chamber, such as by creating a chamber access opening that is smaller than the filter frame 34. As described below, the filter retaining mechanism 30 is further configured to facilitate passage of the filter assembly 24 through this chamber access opening when desired by a user (not shown).

The air treatment device 22 can assume a wide variety of forms, and can be adapted to perform a variety of operations/functions in addition to treating or filtering room air. Thus, for example, the air treatment device 22 can be a room air purifier, a dehumidifier, etc. Regardless, the housing 26 is sized to render the system 20 portable (e.g., can be carried or moved by an adult) and maintains various control feature(s)/circuitry, power source/power converter(s), etc. that are not otherwise reflected in FIG. 1 but are understood by one of skill in the art.

Figure 2A:
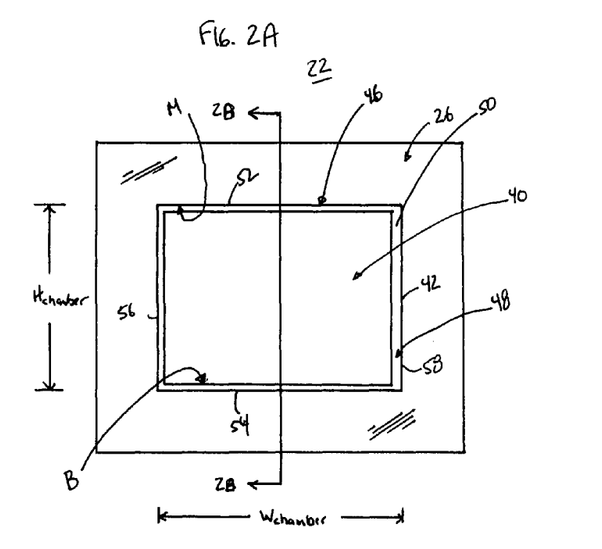
FIG. 2A is a simplified front view of a portion of an air treatment device of the system of FIG. 1, with portions shown in block form.
Figure 2B:
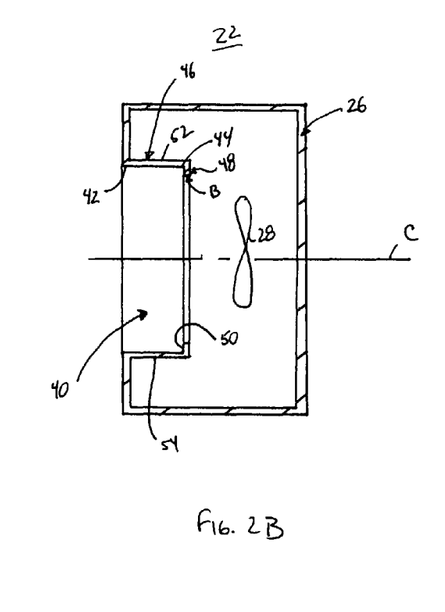
FIG. 2B is a schematic cross-sectional view of the device of FIG. 2A.

To better understand a relationship of the air treatment device 22 relative to the filter assembly 24, one embodiment of the air treatment device 22 in generic form and with the filter retaining mechanism 30 (FIG. 1) removed is shown in FIGS. 2A and 2B. Once again, the housing 26 maintains the blower 28 (drawn schematically in FIG. 2B) along with other system components such as control features, etc. (not shown). Further, the housing 26 defines a filter chamber 40 (referenced generally in FIGS. 2A and 2B) that is fluidly open to the blower 28, extending generally between an access end 42 and a back end 44, both of which are best shown and referenced generally in FIG. 2B. The back end 44 is opposite the access end 42, and with the one embodiment of FIGS. 2A and 2B, is fluidly adjacent the blower 28. Alternatively, the filter chamber 40 can be arranged such that the access end 42 is fluidly adjacent the blower 28, or the blower 28 can be disposed between the access end 42 and the back end 44. Regardless, the phrase "access end" is in reference to a point at which a filter assembly (such as the filter assembly 24 of FIG. 2C) can be inserted in to, and removed from, the filter chamber 40 by a user. Though not shown, a movable or removable door/panel can further be provided (and can be or include a grill or other configuration allowing passage of air) with the housing 26 that selectively covers the access end 42.

The filter chamber 40 is formed at least in part by framework 46 that can assume a wide variety of forms (e.g., by one or more walls or panels, one or more brackets, etc.). The framework 46 generally extends between the access end 42 and the back end 44 to define a central axis C (FIG. 2B) of the filter chamber 40. The central axis C corresponds with a depth of the filter chamber 40, and with the one embodiment of FIGS. 2A and 2B is horizontal (with the housing 26 in the upright orientation of FIGS. 2A and 2B). Alternatively, the housing 26 can be configured such that the filter chamber central axis C is non-parallel relative to a horizontal plane (with the housing 26 in an upright orientation). Even further, the filter chamber 40 can be configured such that the access end 42 is at a bottom of the housing 26, with the filter chamber 40 extending vertically. Regardless, a flange or shelf 48 extends inwardly from (or relative to) the framework 46 at or adjacent the back end 44, as best shown in FIG. 2B. The flange 48 forms a filter support surface 50 against which a filter assembly (shown at 24 in FIG. 2C) can nest when placed within the filter chamber 40. The flange 48 can extend from an entirety of a perimeter of the framework 46, or only a portion thereof. Similarly, the flange 48 can be integrally formed with the framework 46 (or portion thereof), or can be separately formed and subsequently assembled to the framework 46. Finally, the framework 46 can be generally characterized as defining, relative to the upright orientation of the housing 26, a top side 52, a bottom side 54, and first and second lateral sides 56, 58 (referenced generally in FIG. 2A), it being understood that directional terminology is used for ease of explanation, and is in no way limiting.

With these general components in mind, the filter chamber 40 is sized and shaped to maintain a filter assembly (24 in FIG. 2C) in a desired orientation relative to the blower 28, for example generally perpendicular to the central axis C. As such, the filter chamber 40 can be described in terms of an opening size or area defined in a plane perpendicular to the central axis C (i.e., perpendicular to a depth dimension of the filter chamber 40, with the opening area corresponding with an available height and width of the filter chamber 40 at any point along the central axis C. The framework 46 defines a maximum opening area M (referenced generally in FIG. 2A) of the filter chamber 40, with this maximum opening area M being commensurate with a maximum height $H_{chamber}$ and maximum width $W_{chamber}$ defined by the framework 26. Inward extension of the flange 48 relative to the framework 46 defines a back end opening area B (referenced generally in FIG. 2A) that is less than the maximum opening area M. In some embodiments, the framework 46 may taper (due to drafting during manufacture) from the access end 42 to the back end 44 such that the chamber height and/or width (and thus the chamber opening area) may be less at the back end 44 as compared to the access end 42. In any event, the flange 48 presents a reduction in at least one of the chamber opening height and width.

Figure 2C:
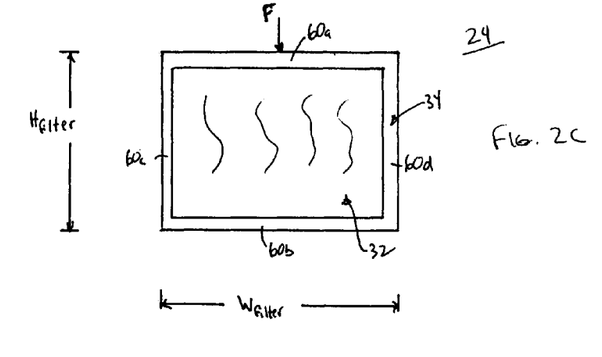
FIG. 2C is a simplified front view of a filter assembly portion of the system of FIG. 1.

With additional reference to FIG. 2C, the filter assembly 24 is sized and shaped in accordance with the filter chamber 40. In particular, the filter frame 34, that otherwise maintains the filter media 32, defines a filter assembly height $H_{filter}$, width $W_{filter}$, and thickness (not shown). The filter assembly height $H_{filter}$ and width $W_{filter}$ combine to define a filter assembly size or area, and correspond with dimensions of the filter chamber 40 such that the filter assembly 24 readily fits within the filter chamber 40 along the housing framework 46. That is to say, the filter assembly height $H_{filter}$ and width $W_{filter}$ are selected to be slightly smaller than the corresponding maximum chamber opening height $H_{chamber}$ and width $W_{chamber}$ such that the filter assembly 24 can slidably nest within the filter chamber 40 along the framework 46. At least one of the back end 42 opening height and width is less that the corresponding filter assembly dimension $H_{filter}$, $W_{filter}$ such that the filter assembly 24 can nest against the filter support surface 50. Thus, the flange 48 impedes or prevents movement of the filter assembly 24 beyond or through the back end 44 of the filter chamber 40. Beyond these general constraints, the filter assembly 24 can assume a wide variety of forms. For example, the filter media 32 can comprise any number of acceptable material(s) selected to filter contaminants from room air. The filter frame 34 can also be constructed from a variety of materials (e.g., cardboard, plastic, etc.).

In one embodiment, the filter assembly 24 construction is selected such that the filter assembly 24 can be primarily non-permanently deflected or deformed from a natural state via placement of an external force thereon. The filter assembly 24, and in particular the filter frame 34, defines, in one embodiment, border segments 60a-60d. Primarily non-permanent deflection of the filter assembly 24 is in reference to placement of a force on one or more of the border segments 60a-60d causing a deflection thereof, followed by "rebounding" or recovery of the filter assembly 24 upon removal of the force by at least 50%, more preferably at least 75%. For example, in FIG. 2C, a force F is shown as being applied to the first border segment 60a. In response to this force F, the first border segment 60a will deflect or deform inwardly resulting in a reduction in the effective height of the filter assembly (at least at the location the force F is applied). This deformation is "primarily non-permanent" in that upon removal of the force F, the filter assembly 24 will naturally or automatically revert back toward the natural state shown in FIG. 2C recovering at least 50%, preferably at least 75%, of the reduction in the effective height cased by application of the force F. Thus, the filter assembly 24 can be described as inherently exhibiting an internal spring force when subjected to a force or load. This primarily non-permanent deflection attribute of the filter assembly 24 is exhibited at forces F of at least 2 pounds.

To achieve this primarily non-permanent deflection characteristic, the filter frame 34 is formed of an appropriate material, such as cardboard, felt, rubber, thin plastics, etc. As described below, the primarily non-permanent deflection attribute of the filter assembly 24 facilitates assembly to and from the housing 26 that, in one embodiment, entails only a minor level of deflection (e.g., on the order of 5 mm), such that a wide variety of materials can be employed for the filter frame 34 (and the filter media 32). For example, in one embodiment, the filter assembly 24 is a filter assembly having pleated filter media and a cardboard frame akin to filter assemblies available under the trade name Filtrete™ from 3M Company of St. Paul, Minn., such as a Filtrete™ Air Cleaning Filter adapted for use with portable air treatment systems. The Filtrete™ filter assembly is uniquely modified to have appropriate dimensions, for example 16"×9"×0.8"; 21.2"×11.5"×0.8"; and 13"×18"×0.8", as well as pleating pattern with glue bead pleat stabilization and a frame having a reduced extension across the filter media (e.g., on the order of 0.5 inch) so as elevate the exposed filter media surface area and reduce resistance to deflection as described below. While the filter assembly 24 is generally illustrated in FIG. 2C as being rectangular in shape, any other shape, such as square, circular, irregular, etc., is also acceptable with it being understood that the filter chamber 40 will have a similar, corresponding shape.

Figure 3A:
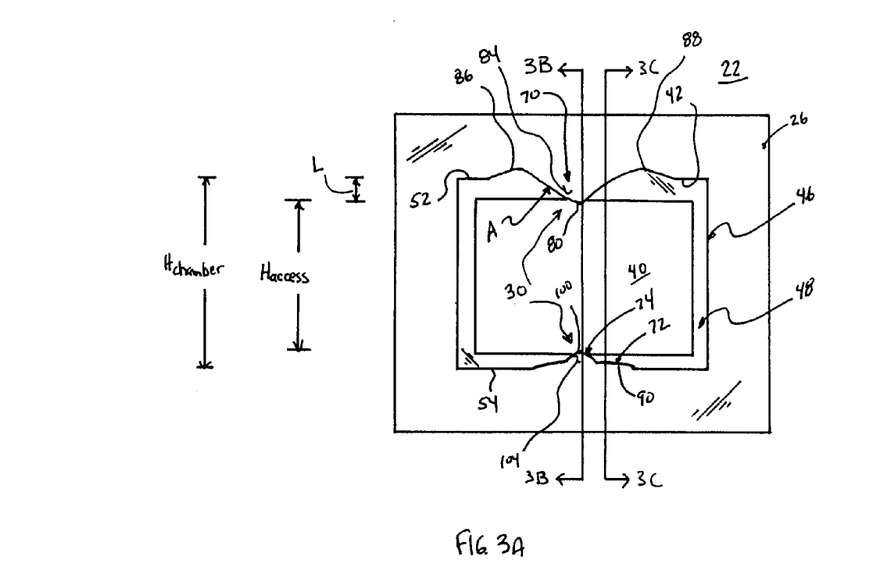
FIG. 3A is a simplified front view of one embodiment air treatment device in accordance with principles of the present invention.
Figure 3B:
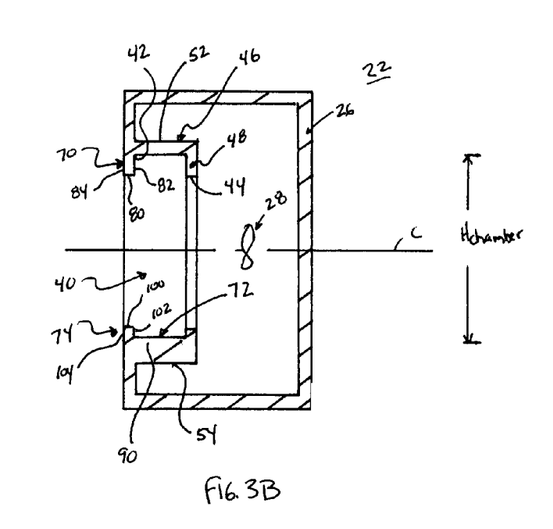
FIG. 3B is a schematic cross-sectional view of the device of FIG. 3A along the lines 3B-3B.
Figure 3C:
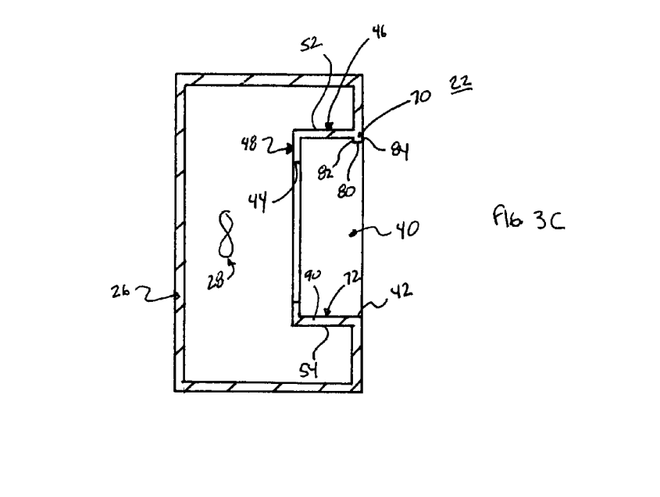
FIG. 3C is a schematic cross-sectional view of the device of FIG. 3A along the lines 3C-3C.

With the above background in mind, one embodiment of the air treatment device 22, including the housing 26 and the filter retaining mechanism 30 (referenced generally), is shown in FIGS. 3A-3C. As a point of reference, the housing 26 generally corresponds with the description provided above, it being understood that the air treatment device 22 can include a number of other components not otherwise shown. Further, the filter chamber 40 reflected in FIGS. 3A-3C can also assume a variety of other shapes, sizes, orientations, etc.

The filter retaining mechanism 30 is associated with the filter chamber 40 and includes, with the one embodiment of FIGS. 3A-3C, a first body 70, a bearing surface 72 and a second body 74. As described below, each of the bodies 70, 74 and the bearing surface 72 are rigidly associated with the framework 46 (e.g., formed as inward extensions from the framework 46), and are non-moveable. For example, in one embodiment, the first body 70 is associated with the top side 52 of the framework 46, whereas the bearing surface 72 and the second body 74 are associated with the bottom side 54. In general terms, the first and second bodies 70, 74 serve to selectively capture a filter assembly 24 (FIG. 2C) within the filter chamber 40, with the bearing surface 72 providing a means for facilitating movement of the filter assembly 24 relative to at least the first body 70.

The first body 70 is, in one embodiment, a catch or latch formed as an inward (e.g., or downward relative to the orientation of FIGS. 3A-3C) extension from the top side 52 of the framework 46 at or adjacent the access end 42 of the filter chamber 40. This inward extension is characterized as projecting along a height dimension of the filter chamber 40 and is best seen by a comparison of FIGS. 3A and 3B (that otherwise depicts the first body 70) with FIGS. 2A and 2B (that otherwise do not include the first body 70). The first body 70 is transversely centered relative to the top side 52, although in other embodiments, is offset relative to a center of the top side 52. Regardless, the first body 70 defines a terminal edge 80 opposite the top side 52, an interior face 82 and an exterior face 84. The interior face 82 is longitudinally spaced from the flange 48 (as best shown in FIG. 3B). Extension of the first body 70 relative to the top side 52 to the terminal edge 80 defines a length L of the first body 70, with the terminal edge 80 reducing an effective dimension of the filter chamber 40 at the access end 42. That is to say, the first body 70 in combination with the framework 46 (and, in some embodiments, in further combination with the second body 74 as described below) defines an effective height $H_{access}$ of the filter chamber 40 at the access end 42 that is less than the maximum chamber opening height $H_{chamber}$ (otherwise defined by the framework 46 longitudinally between the first body 70 and the flange 48, as best shown in FIG. 3B).

The first body 70 can be comprised of a variety of rigid materials (e.g., metal, plastic, etc.), and in one embodiment is integrally formed with the framework 46 as part of a plastic molding manufacturing technique. Alternatively, the first body 70 can be formed apart from the framework 46 and subsequently assembled thereto. In one embodiment, the terminal edge 80 forms a convex curve (relative to the top side 52), although other shapes (e.g., linear, curvilinear, irregular, etc.) are also acceptable. Regardless, in one embodiment, the first body 70 is formed to define a maximum length L (i.e., maximum distance of the terminal edge 80 from the top side 52) in the range of 1-15 mm, more preferably 2-6 mm. Further, to facilitate interaction with a filter assembly 24 (FIG. 2C) by a user otherwise manipulating the filter assembly 24 relative to the filter chamber 40 as described below, in one embodiment the filter retaining mechanism 30 includes first and second recesses 86, 88 formed in the housing 26 and opposite ends of the first body 70 as best shown in FIG. 3A. The recesses 86, 88 are each characterized as being a slot in, or removal of material from, the housing 26/framework 46 at the top side 52, and are sized to permit insertion of an adult's finger(s) into the filter chamber 40.

The bearing surface 72 is, in one embodiment, formed by a bearing body 90 that projects inwardly (e.g., or upward relative to the orientation of FIGS. 3A-3C) from the bottom side 54 of the framework 46. This inward projection is reflected by a comparison of FIGS. 3A and 3B (that otherwise depict the bearing surface 72/bearing body 90) with FIGS. 2A and 2B (in which the bearing surface 72/bearing body 90 is absent). The bearing surface 72 is positioned opposite the first body 70, and thus in one embodiment is centered relative to the bottom side 54. Regardless, the bearing surface 72 is preferably a convex curve (relative to the bottom side 54 and as best shown in FIG. 3A) and extends from at or adjacent the access end 42 to the flange 48, although in other embodiments terminates at a point spaced from the flange 48. With either configuration, the bearing surface 72/bearing body 90 has a maximum length (i.e., maximum distance of the bearing surface 72 relative to the bottom side 54) on the order of 2-15 mm, preferably 4-6 mm.

The bearing surface 72/bearing body 90 can be formed from a variety of rigid materials similar to the first body 70, and in one embodiment is integrally formed with housing 26/framework 46. Alternatively, the bearing surface 72/bearing body 90 can be formed separately from, and subsequently assembled to, the housing 26/framework 46. By projecting into the filter chamber 40 longitudinally between the access end 42 and the back end 44 in the height dimension, the bearing surface 72/bearing body 90 reduces the maximum chamber opening height $H_{chamber}$ of the filter chamber 40.

The second body 74 is similar to the first body 70 previously described, and thus is formed as a latch or catch via inward (e.g., or upward relative to the orientation of FIGS. 3A and 3B) extension from the bottom side 54 of the framework 46 (in a height dimension of the filter chamber 40). In one embodiment, the second body 74 is positioned opposite the first body 70, and terminates in an edge 100 opposite the bottom side 54. The second body 74 can be formed of any rigid material, integral with, or separate from, the bearing surface 72/bearing body 90. As best shown in FIG. 3A and by a comparison of FIG. 3B with FIG. 3C, the second body 74 has, in one embodiment, a width less than that of the bearing surface 72, although in other embodiments can be wider (e.g., can extend along an entirety of the bottom side 54). The second body 74 defines an interior face 102 and an exterior face 104. The interior face 102 is longitudinally spaced from the flange 48 such that the second body 74 has a depth or thickness that is less than that of the bearing surface 72. With this one embodiment, then, the second body 74 combines with the first body 70 and the framework to define the effective chamber access opening height $H_{chamber}$. The second body 74 can assume a wide variety of other forms, and in some embodiments as described below, can be eliminated.

Figure 4A:
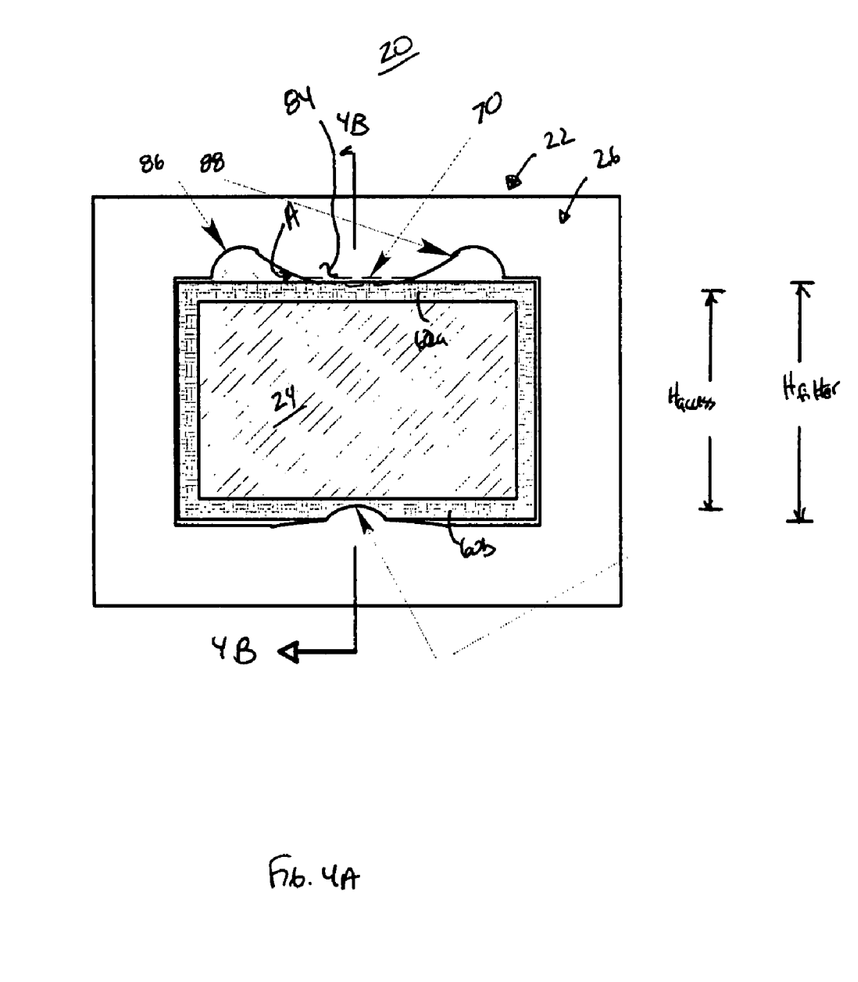
FIGS. 4A and 4B illustrate partial assembly of a filter to the air treatment device of FIG. 3A as part of a method in accordance with principles of the present invention.
Figure 4B:
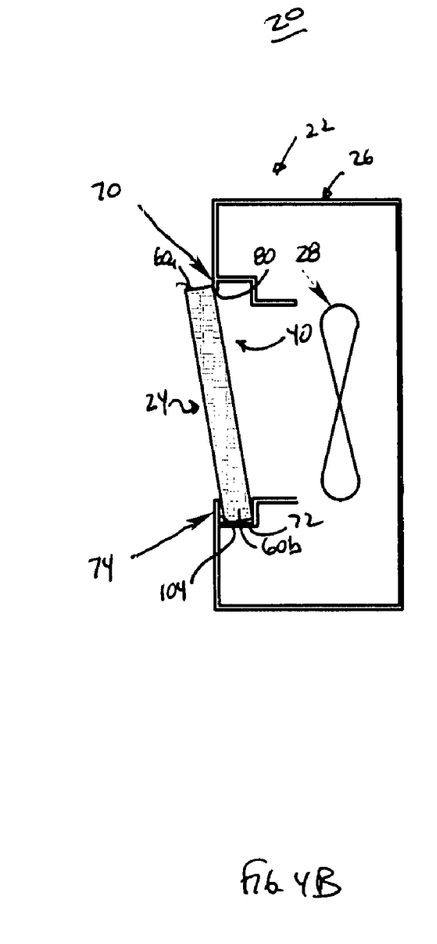

With reference to FIGS. 4A and 4B, a method of manipulating the filter assembly 24 relative to the air treatment device 22 in accordance with principles of the present invention, for example loading the filter assembly 24 into the filter chamber 40, includes first positioning the filter assembly at the chamber access opening A such that the first border segment 60a is adjacent the first body 70. In one embodiment, the positioning step includes inserting the second border segment 60b within the filter chamber 40, located longitudinally between the interior face 102 of the second body 74 and the flange 48. With this orientation, the second border segment 60b abuts the bearing surface 72, whereas the first border segment 60a is outside of the filter chamber 40, adjacent or contacting the exterior face 84 of the first body 70. As shown in FIGS. 4A and 4B, the filter assembly 24 is sized such that in the natural state, the filter assembly height $H_{filter}$ is greater than the effective access opening height $H_{access}$, such that the filter assembly 24 is impeded from entering the filter chamber 40.

Figure 5A:
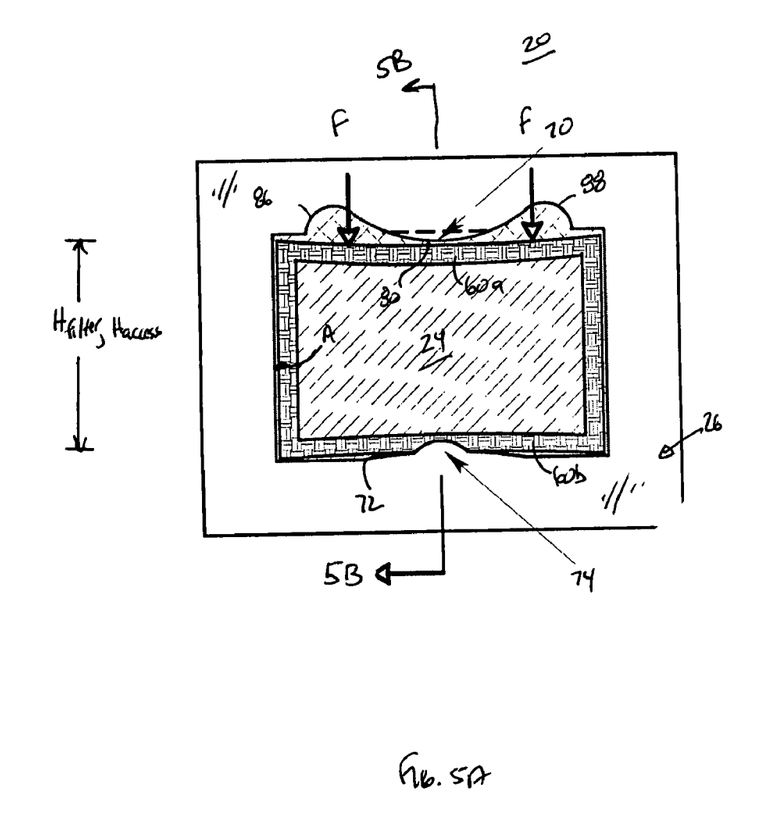
FIGS. 5A and 5B illustrate further assembly of the filter from the position of FIGS. 4A and 4B.

Once positioned, the filter assembly 24 is subjected to a user-imparted force that causes a primarily non-permanent deflection of the filter assembly 24 to occur, sufficient to allow the first border segment 60a to "clear" the terminal edge 80 of the first body 70. For example, and with reference to FIGS. 5A and 5B, the user (not shown) applies a downward force (represented as "F" in FIGS. 5A and 5B) on to the first border segment 60a, near a center of the first border segment 60a (such that the side border segments 60c, 60d will not overtly resist the force F). In one embodiment, this force is applied by both of the user's hands (not shown) that are otherwise positioned along the first border segment 60a in the vicinity of the recesses 86, 88. Regardless, in response to the force F, the second border segment 60b is biased against the bearing surface 72 (best shown in FIG. 5B). Due to the rigid construction of the bearing surface 72, as well as the bearing surface 72 having a convex curvature and a width that is less than a corresponding dimension of the second border segment 60b, the second border segment 60b will, in turn, bow or deflect about the bearing surface 72, as best shown in FIG. 5A. Simultaneous with this deflection or deformation, the first border segment 60a also experiences deflection or deformation. Thus, deflection of the filter assembly 24 is distributed over the first and second border segments 60a, 60b.

Figure 5B:
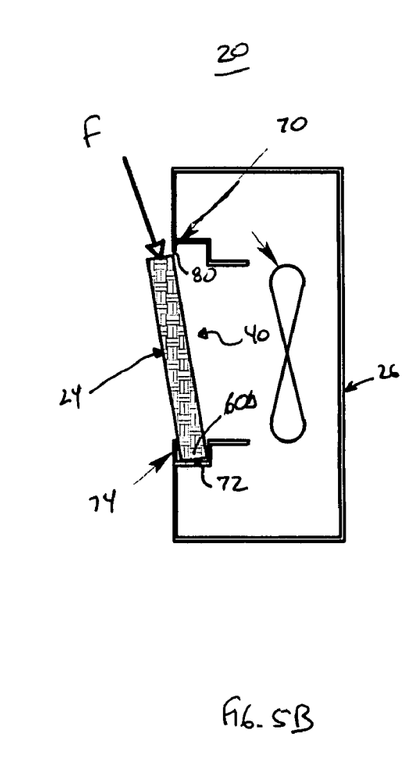

The force F is continually applied until the first border segment 60a has deflected or deformed a sufficient extent or distance to clear the terminal edge 80 of the first body 70. In light of the force distribution described above, the force F necessary to sufficiently deflect the first border segment 60a "below" the terminal edge 80 of the first body 70 is effectively reduced by more than 50% as compared to a configuration in which the bearing surface 72 were not present (i.e., if the second border segment 60b was abutting an entirely flat surface). Regardless, the non-permanent deflection characteristic of the filter assembly 24 allows for necessary deflection of the first border segment 60a to occur, such that in the deflected state, the filter assembly 24 now "fits" within the chamber access opening A. In other words, in the deflected state, the filter assembly 24 has a height $H_{filter}$ commensurate with the effective access opening height $H_{access}$, such that filter assembly 24 can, with a user-applied inward force or pressure, slide interiorly beyond the first body 70. In this regard, the user's fingers (not shown) can pass through the slots 86, 88 to fully insert the filter assembly 24 within the filter chamber 40.

Figure 6A:
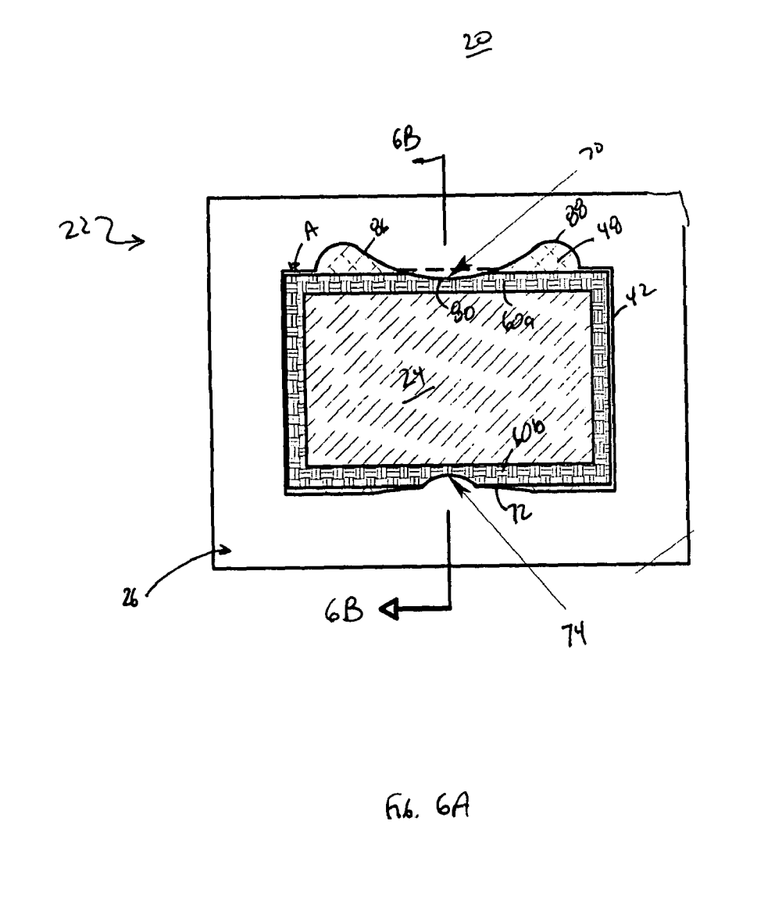
FIGS. 6A and 6B illustrate final assembly of the filter within the air treatment device from the position of FIGS. 5A and 5B.
Figure 6B:
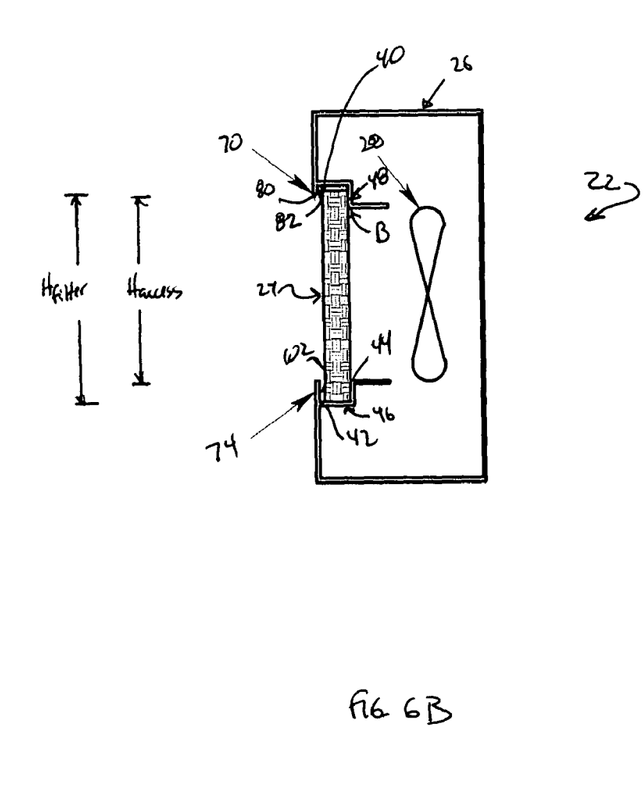

Once the filter assembly 24 is fully within the filter chamber 40, the force F is removed. Due to the inherent spring attribute of the filter assembly 24, upon removal of the force F, the filter assembly 24 will naturally or automatically revert back toward the natural state, and thus be captured within the filter chamber 40 as shown in FIGS. 6A and 6B. More particular, the filter assembly 24 reverts back toward the natural height $H_{filter}$. The filter assembly 24 may experience a slight "setting" of the deflection caused by the force F, but will primarily recover toward the natural height $H_{filter}$ such that the filter height $H_{filter}$ is less than or equal to the maximum chamber opening height $H_{chamber}$ of the filter chamber 40, and is greater than that the height $H_{access}$ of the access opening A or the back opening B. Thus, in final form, the filter assembly 24 is retained within the filter chamber 40, captured relative to the back end 44 via the flange 48 and relative to the access end 42 via the interior face 82 of the first body 70 and, where provided, the interior face 102 of the second body 74.

In one embodiment, the filter assembly 24 is loosely retained within the filter chamber 40 (e.g., a thickness of the filter assembly 24 is less than a depth of the filter chamber 40, and the filter assembly 24 does not frictionally engage the framework 46/bearing surface 72 along more than one of the border segments 60a-60d). With this arrangement, upon activation of the blower 28, the filter assembly 24 will be drawn or forced against the flange 48 (or the interior surfaces 82, 102 of the first and second bodies 70, 74 depending upon a construction of the air treatment device 22), thereby sealing the filter assembly 24 relative to the housing 26.

When desired, a user (not shown) can remove the filter assembly 24 from the filter chamber 40 in a manner similar to that described above. For example, the user inserts his or her fingers through the slots 86, 88 and grasps the first border segment 60a. A downward force is applied to the first border segment 60a, causing the first and second border segments 60a, 60b to deflect/deform as previously described. Once deflection of the first border segment 60a sufficient to permit clearance about the terminal edge 80 of the first body 70 is achieved, the first border segment 60a is pulled outwardly from the filter chamber 40, with the filter assembly 24 pivoting on the second border segment 60b that is otherwise in contact with the bearing surface 72. With the first border segment 60a now outside of the filter chamber 40, the filter assembly 24 can then be entirely removed.

Figure 7A:
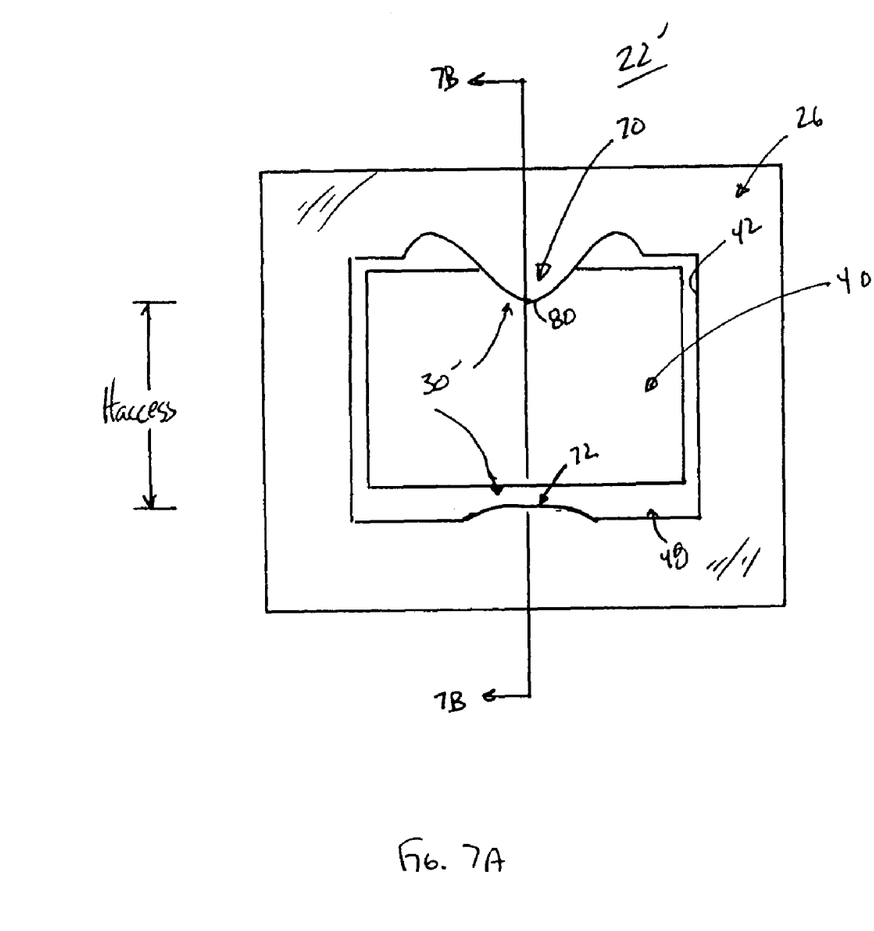
FIGS. 7A and 7B illustrate another embodiment air treatment device of the system of FIG. 1 in accordance with principles of the present invention.
Figure 7B:
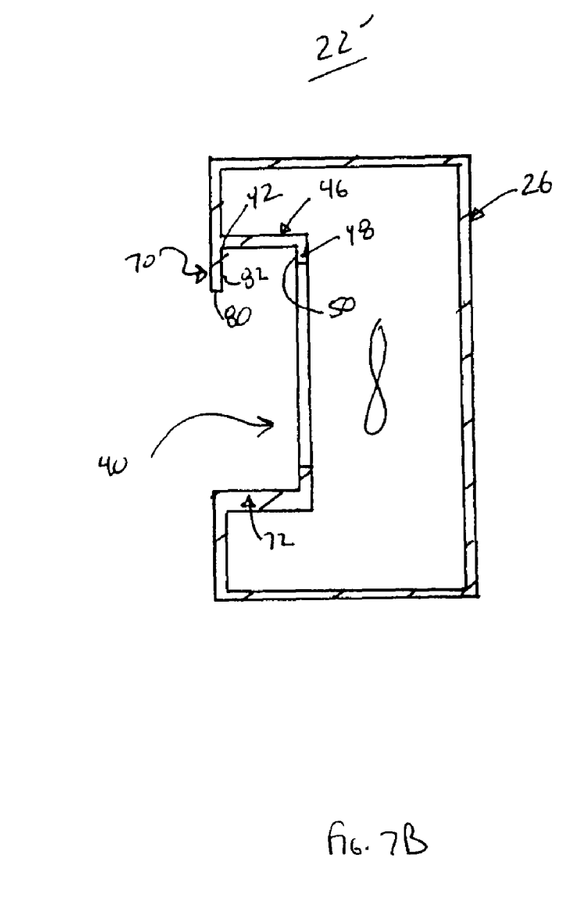

While the filter retaining mechanism 30 has been described as including the second body 74, in other embodiment, the second body 74 can be eliminated. For example, FIGS. 7A and 7B illustrate an alternative embodiment air treatment device 22' including the housing 26/framework 46 as previously described, along with a filter retaining mechanism 30' comprising the first body 70 and the bearing surface 72. The air treatment device 22' is essentially identical to the air treatment device 22 above. The filter retaining mechanism 30' establishes a reduced-sized access height $H_{access}$ (as compared to a maximum chamber opening height $H_{chamber}$ (FIG. 2A) between the first body 70 and the flange 48) configured to selective retain the filter assembly 24 (FIG. 2C) within the filter chamber 40. Manipulation of the filter assembly 24 relative to the first body 70 is essentially identical to that described above, whereby the filter assembly 24 will primarily non-permanently deflect (via a force applied at a border segment of the filter assembly 24 otherwise opposite the bearing surface 72) an amount sufficient to permit clearance about the terminal edge 80 of the first body 70. With this configuration, the filter assembly 24 is retained within the filter chamber 40 via the interior face 82 of the first body 70 and the filter support surface 50 of the flange 48.

Figure 8A:
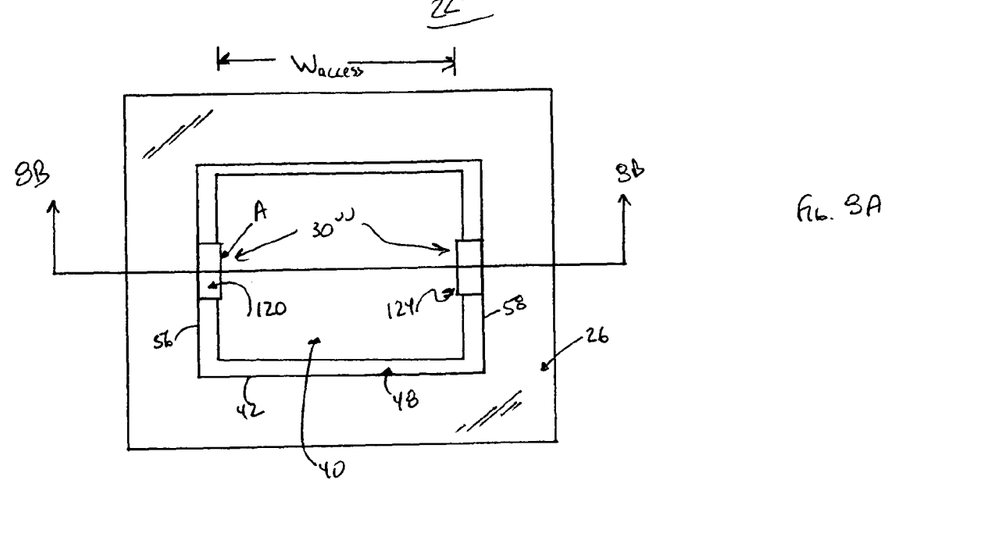
FIG. 8A is a simplified front view of another embodiment air treatment device in accordance with principles of the present invention.
Figure 8B:
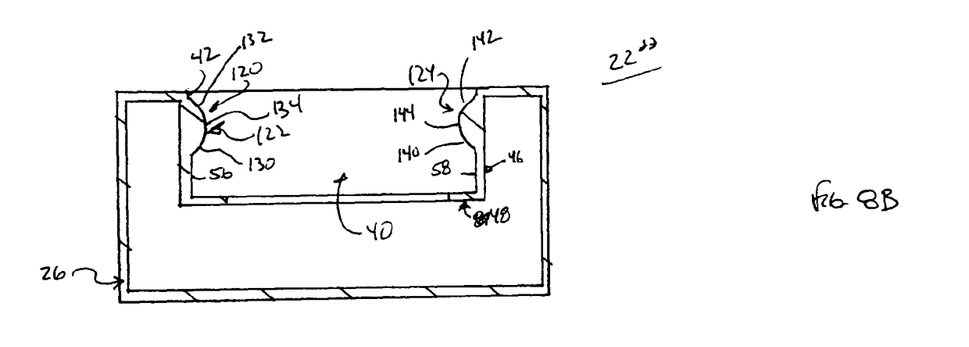
FIG. 8B is a schematic cross-sectional view of the device of FIG. 8A along the lines 8B-8B.

Yet another embodiment air treatment device 22" in accordance with principles of the present invention is shown in FIGS. 8A and 8B. The air treatment device 22" includes the housing 26 as previously described (and thus including the framework 46 and the flange 48) and a filter retaining mechanism 30" (referenced generally), as well as various other components not shown. The filter retaining mechanism 30" is again associated with the framework 46 and includes a first body 120, at least one bearing surface 122 (referenced generally in FIG. 8B), and a second body 124. Details on the various components are provided below. In general terms, however, the first and second bodies 120, 124 are rigid, non-moveable structures that establish a reduced-sized access opening (i.e., in the width dimension) to the filter chamber 40. The bearing surface(s) 122 provide a means for readily inserting/removing a filter assembly 24 (FIG. 2C) relative to the filter chamber 40 by promoting deflection of the filter assembly 24 about the first and second bodies 120, 124.

The first body 120 extends inwardly (or rightward relative to the orientation of FIGS. 8A and 8B) from the first lateral side 56 of the framework 46 (thus along the width dimension of the filter chamber 40) at or adjacent the access end 42 of the filter chamber 40. Extension or projection of the first body 120 is further illustrated by a comparison of FIGS. 8A and 8B (that otherwise depict the first body 120) with FIGS. 2A and 2B (in which the first body 120 is not shown). The first body 120 is laterally centered relative to a corresponding dimension of the first lateral side 56, although in other embodiments can be off-set relative to the first lateral side 56. Regardless, and with specific reference to FIG. 8B, the first body 120 defines an interior face 130, an exterior face 132 and a terminal edge 134. The terminal edge 134 is formed at a convergence of the interior and exterior faces 130, 132, and is opposite the first lateral side 56. Thus, transverse extension of the first body 120 from the first lateral side 56 to the terminal edge 134 represents a length of the first body 120.

In one embodiment, the interior and exterior faces 130, 132 serve as two of the bearing surfaces 122. Thus, with the one embodiment of FIGS. 8A and 8B, the bearing surface 122 is integrally formed with the first body 120. Alternatively, the bearing surface 122 of the filter retaining mechanism 30" can be provided apart from the first body 120 (such as, for example, as part of the second body 124 as described below).

The second body 124 is, in one embodiment, identical in shape and construction with the first body 120, and extends or projects inwardly (or leftward relative to the orientation of FIGS. 8A and 8B) from the second lateral side 58 of the framework 46 (thus along the width dimension of the filter chamber 40). The second body 124 is laterally centered relative to the first body 120 and thus the second lateral side 58 in one embodiment; alternatively, however, the first and second bodies 120, 124 can be laterally off-set relative to one another and/or with respect to the corresponding lateral side 56, 58. Regardless, the second body 124 defines an interior face 140, an exterior face 142 and a terminal edge 144. Once again, a length of the second body 124 is formed at the terminal edge 144, with the interior and exterior faces 140, 142 serving as two of the bearing surfaces 122.

The terminal edges 134, 144 of the first and second bodies 120, 124 combine to define a reduced-sized access opening A for the filter chamber 40. More particularly, with the embodiment of FIGS. 8A and 8B, the first and second bodies 120, 124 combine to define an effective width $W_{access}$ of the filter chamber 40 at the access opening A that is less than the maximum chamber opening width $W_{chamber}$. As described below, the width $W_{access}$ at the access opening A is selected to be less than a corresponding dimension (e.g., width) of the filter assembly 24 (not shown) to be used with the air treatment device 22". In one embodiment, each of the bodies 120, 124 as a length in the range of 1-10 mm, preferably 2-6 mm, although other dimensions are also acceptable.

Figure 8C:
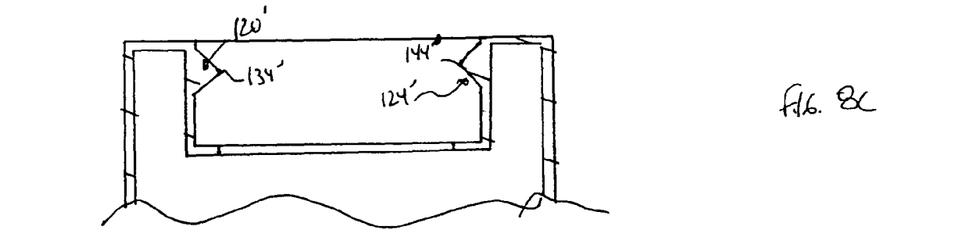
FIG. 8C is a schematic cross-section view of another alternative embodiment air treatment device in accordance with the present invention.

The interior and exterior surfaces 130, 132 and 140, 142 of the respective bodies 120, 124 are preferably shaped so as to be non-perpendicular relative to a plane defined by the corresponding lateral side 56, 58 of the framework 46. With this one configuration, the surfaces 130, 132 and 140, 142 serve as guide surfaces for guiding a filter assembly 24 (FIG. 2C) into and out of the filter chamber 40. For example, as shown in FIG. 8B, in one embodiment, each of the bodies 120, 124 have a curved or convex profile, with the corresponding surfaces 130, 132 and 140, 142 being substantially symmetrical. Alternatively, the bodies 120, 124 can assume a variety of other shapes that may or may not be symmetrical. To this end, FIG. 8C illustrates alternative embodiment first and second bodies 120', 124' each having a truncated triangular-shaped profile, with the corresponding terminal edge 134', 144' being a small radius tip. While the first and second bodies 120, 124 and 120', 124' have been illustrated as having an identical profile shape, in other embodiments, the first and second bodies 120, 124 are dissimilarly shaped.

Figure 9A:
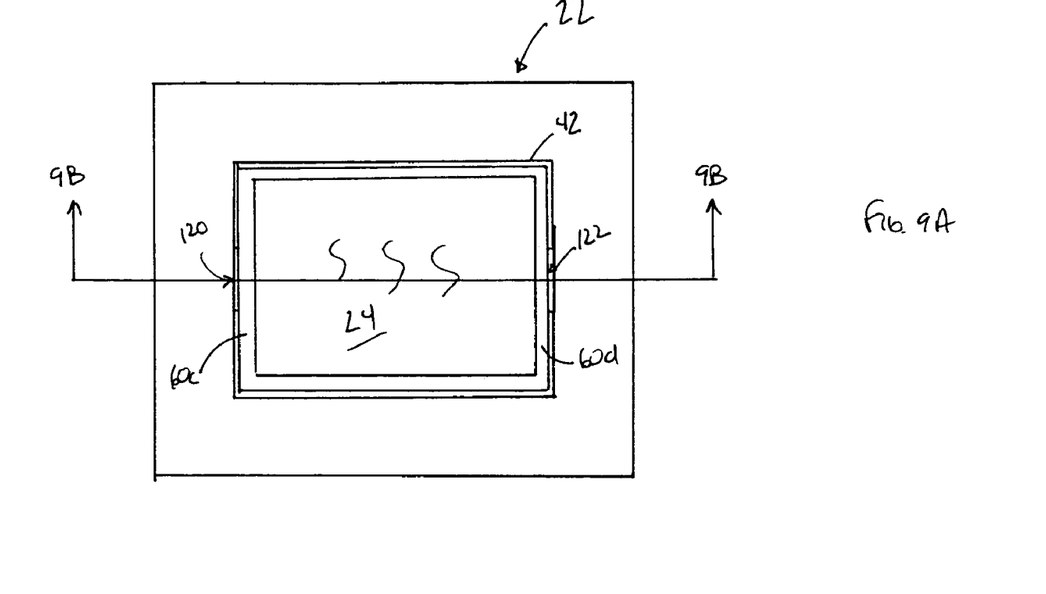
FIGS. 9A and 9B illustrate partial assembly of a filter to the device of FIG. 8A.
Figure 9B:
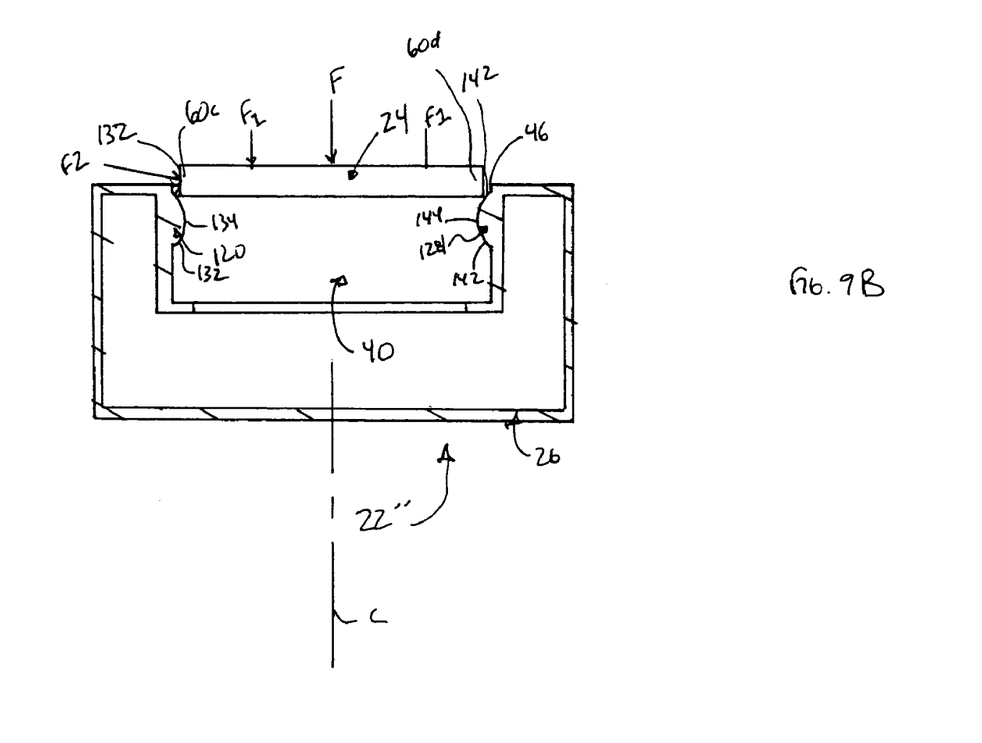

Manipulation of the filter assembly 24 relative to the air treatment device 22", such as insertion of the filter assembly 24 into the filter chamber 24, is similar to previous embodiments, and is described with initial reference to FIGS. 9A and 9B. The filter assembly 24 is positioned at the access end 42 of the filter chamber 40, with the third border segment 60c abutting or adjacent the exterior face 132 of the first body 120, and the fourth border segment 60d abutting or adjacent the exterior face 142 of the second body 124. The user (not shown) then applies a force to the filter assembly 24 (represented at by arrows F in FIG. 9B). The force F can have one or more directional components relative to the filter assembly 24. For example, in one embodiment, the force F is applied in a direction substantially parallel with the central axis C of the filter chamber 40 (i.e., substantially perpendicular to a plane of the filter assembly 24), thus pushing the filter assembly 24 toward the filter chamber 40 (represented by F1 in FIG. 9B). Alternatively or in addition, the force F can be a substantially parallel with a plane of the filter assembly 24 (e.g., the force F2 shown in FIG. 9B applied to one or both of the border segments 60c and/of 60d). Preferably, the force F is applied near a center of one of the border segment 60a-60d. Regardless, in response to the force F, the filter assembly 24 is forced against the exterior face(s) 132 and/or 142 that in turn exert a compressive force on to the corresponding border segment 60c and/or 60d such that the border segment 60c and/or 60d non-permanently deflects or deforms. In this manner, then, the exterior face(s) 132 and/or 142 serves as a bearing surface about with the border segment 60c and/or 60d deflects.

Figure 10A:
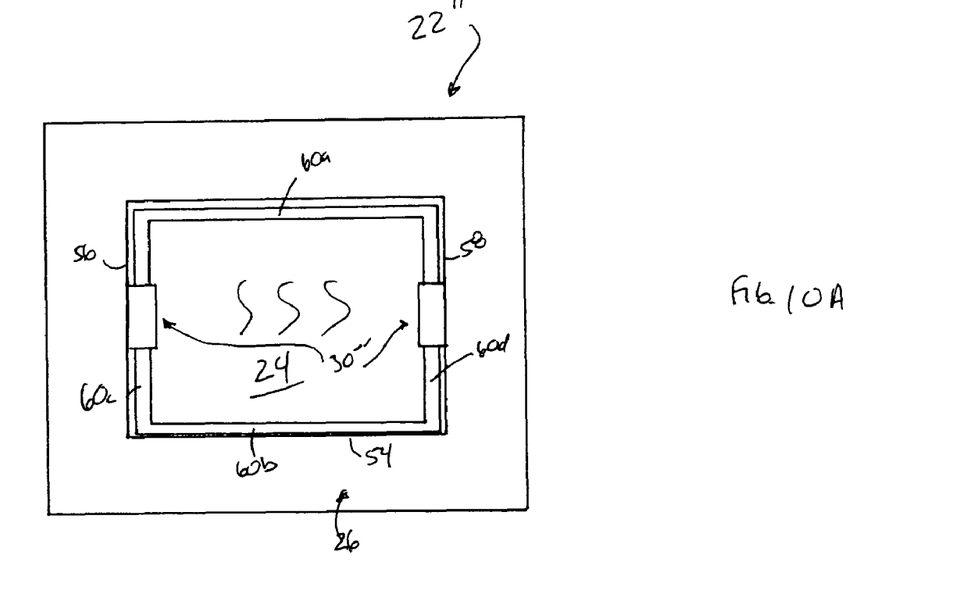
FIGS. 10A and 10B illustrate final assembly of a filter to the device of FIG. 8A.
Figure 10B:
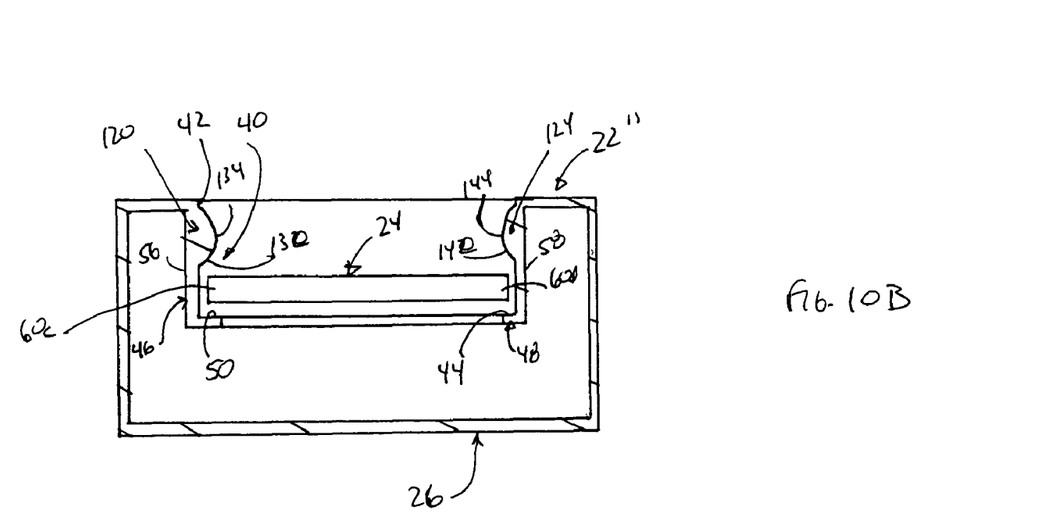

Deflection/deformation of the border segments 60c, 60d continues with further inward movement of the filter assembly 24 (i.e., into the filter chamber 40), with the border segment 60c, 60d riding along the exterior face 132, 142 of the corresponding body 120, 124 until the border segment 60c, 60d is at the corresponding terminal edge 134, 144. Once the filter assembly 24 has progressed beyond the terminal edges 134, 144, the first and second bodies 120, 124 no longer overtly impede further inward movement of the filter assembly 24. Instead, the filter assembly 24 naturally reverts back from the deflected state toward the natural state (of FIG. 2C). The rate at which the filter assembly 24 "springs" back toward the natural state may be such that the border segments 60c, 60d contact and ride along the respective interior face 132, 142. Regardless the filter assembly 24 is positioned longitudinally between the terminal edges 134, 144 and the flange 48 as shown in FIGS. 10A and 10B, and reverts back toward the natural state, expanding in width. Once again, the filter assembly 24 may not rebound or recover in width back to the natural width (prior to application of the force F), but the final width $W_{filter}$ achieved via recovery of the filter assembly 24 will be greater than the effective access opening width $W_{access}$ and less than (or equal to) the maximum chamber opening width $W_{chamber}$.

The filter assembly 24/filter retaining mechanism 30" can be configured and sized such that the filter assembly 24 contacts both the first and second bodies 120, 124 and the flange 48 upon substantial reversion from the deflected state. Alternatively, the filter assembly 24/filter retaining mechanism 30" can be configured and sized such that when the filter assembly 24 has completely reverted to the natural state, the filter assembly 24 is loosely retained between the first and second bodies 120, 124 and the flange 48. In either case, the filter assembly 24 is captured within the filter chamber 40 via the flange 48 and the first and second bodies 120, 124. That is to say, the filter support surface 50 prevents the filter assembly 24 from moving beyond the back end 44, whereas the interior face 132/terminal edge 134 of the first body 120 and the interior face 142/terminal edge 144 of the second body 120 prevent the filter assembly 24 from moving beyond the access end 42.

When desired, the filter assembly 24 can be removed from the filter chamber 40 in various fashions, such as by a user (not shown) grasping the border segments 60c, 60d and pulling the filter assembly 24 outwardly from the filter chamber 40, effectively repeating the process described above, whereby the border segments 60c, 60d will deflect or deform about the terminal edges 134, 144 via a force applied thereto via interface with the corresponding interior face 130, 140. Alternatively, the filter assembly 24 can be removed from the filter chamber 40 by the user grasping the first border segment 60a and applying a moment force to rotate the filter assembly 24 in a generally downward direction. With this approach, the filter assembly 24 effectively pivots relative to the framework 46 at the second border segment 60b. As a result, the third and fourth border segments 60c, 60d are deflected relative to the first and second bodies 120, 124, respectively, due to a bearing interface with the corresponding interior face 130, 140. Rotation of the filter assembly 24 continues until the border segments 60c, 60d have "cleared" the first and second bodies 120, 124, whereby the filter assembly 24 is fully released from the filter chamber 40. One advantage to this methodology is that the pivot point allows the user to multiple the applied force as a lever; if the first and second bodies 120, 124 are at an exact center of the corresponding lateral sides 56, 58 of the framework 46, the user has a 2:1 lever advantage when applying the extracting force to the top or first border segment 60a. As such, the lever advantage can be further enhanced by locating the first and second bodies 120, 124 closer to the bottom side 54 of the framework 46.

While the filter retaining mechanism 30" has been described as including both of the first and second bodies 120, 124, in alternative embodiments, only the first body 120 is provided.

Figure 11:
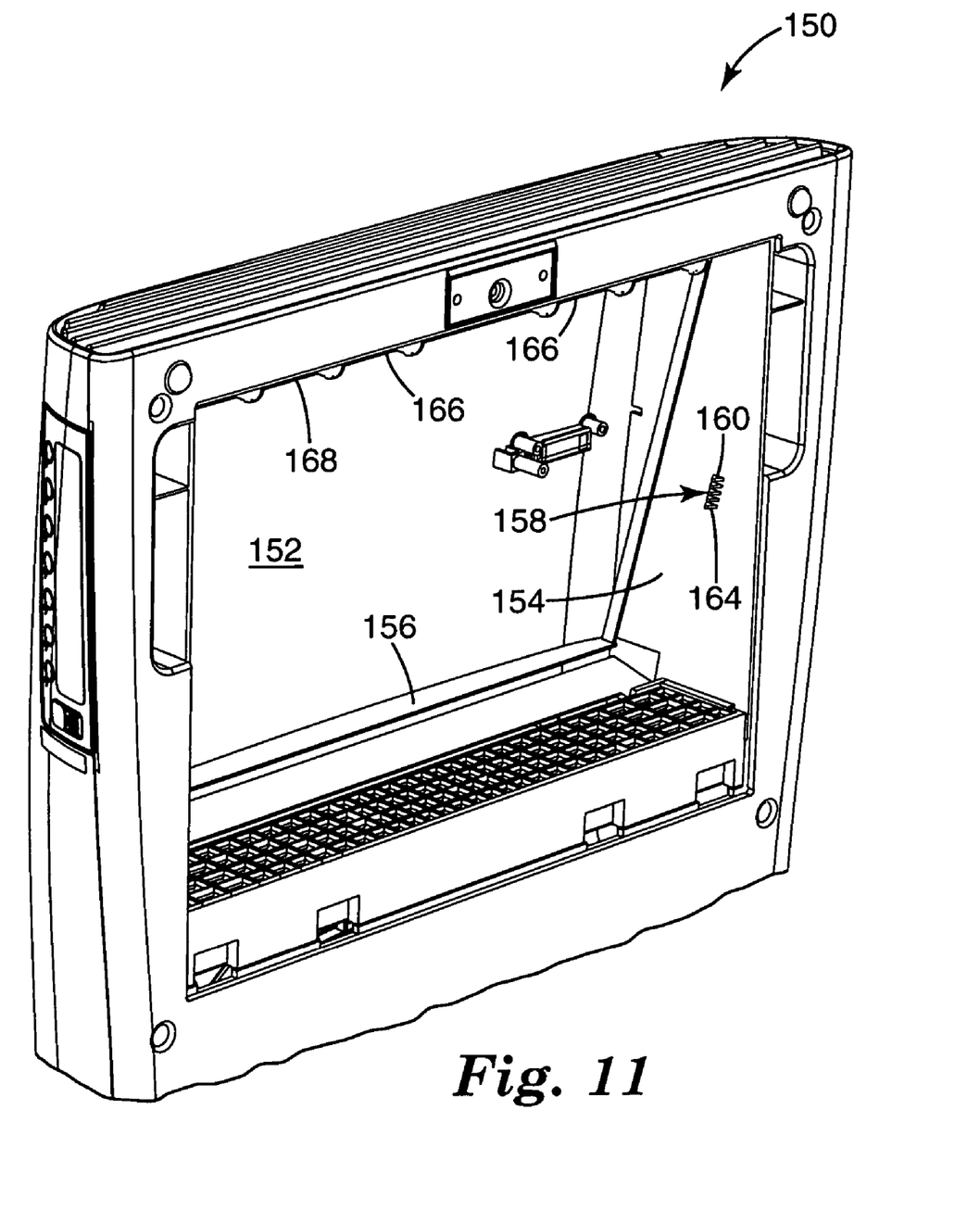
FIG. 11 is a perspective view of another embodiment air treatment device in accordance with principles of the present invention.

Returning to FIGS. 8A and 8B, to more readily afford a user the ability to insert/remove the filter assembly 24 (FIG. 2C), in an alternative embodiment, the filter retaining mechanism 30" further includes one or more finger slots along, for example, the top side 52 of the framework 46. One example of such a configuration is provided in FIG. 11 at which an air treatment device 150 is shown having a filter chamber 152 (referenced generally) defined by framework 154 and a flange 156, along with a filter retaining mechanism 158. The filter retaining mechanism includes a first body 160 and a second body (not shown) (one or both of which provide at least one bearing surface reference generally at 164) and one or more finger slots 166. The finger slots 166 are formed as recesses into a top side 168 of the framework 154 and are sized to permit access by a user's fingers (not shown) into the filter chamber 152.

The air treatment device, including the filter retaining mechanism, and related method of use, in accordance with aspects of the present invention provides a marked improvement over previous designs. The filter retaining mechanism has no moving parts that are otherwise subject to possible failure, and is easy and inexpensive to manufacture as part of the air treatment device housing, or in retrofitting to an existing housing. The filter retaining mechanism and related method of use takes advantage of the non-permanent deflection (or internal spring force) inherent to existing replaceable filter assemblies in a manner not previously recognized.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A portable air treatment device comprising:
a blower;
a housing maintaining the blower and forming a filter chamber that is fluidly open to the blower, the filter chamber generally defined by an access end and a back end opposite the access end, wherein the filter chamber has height, width and depth dimensions and is sized to selectively receive a filter assembly and is defined at least in part by: framework extending from the access end to the back end to establish a maximum height and maximum width of the filter chamber, the framework including opposing, first and second sides each having a length defining one of the height and the width, a flange projecting inwardly relative to the framework at the back end, the flange providing a filter receiving surface and establishing a maximum depth of the filter chamber as a distance between the flange and the access end; and
a filter retaining mechanism for capturing a filter assembly within the filter chamber, the filter retaining mechanism including: a rigid, non-moveable first body spaced from the back end and extending inwardly from the first side in one of the height and width dimensions to a terminal edge, wherein the terminal edge has a length in a direction of the first side length that is less than the first side length, and further wherein the terminal edge combines with the framework to create a chamber access opening having an effective height and effective width, and even further wherein the terminal edge combines with the flange to establish an effective depth that is less than the maximum depth of the filter chamber such that a filter assembly can be captured between the first body and the flange,
a non-moveable first bearing surface protruding inwardly from the second side opposite the terminal edge and positioned a distance from the back end, wherein the bearing surface defines a length in a direction of the second side length, the bearing surface length being less than the second side length.

2. The air treatment device of claim 1, wherein the bearing surface is configured to cause deflection of a filter assembly forced against the bearing surface.

3. The air treatment device of claim 1, wherein the air treatment device is a room air purifier.

4. The air treatment device of claim 1, wherein a second non-moveable bearing surface is provided as a transverse extension of the first body from a first lateral side to the terminal edge.

5. The air treatment device of claim 1, wherein the non-moveable bearing surface is laterally centered between the access end and back end of the framework.

6. The air treatment device of claim 1, wherein the non-moveable bearing surface is off-set relative to the access end of the framework.

7. The air treatment device of claim 1, wherein the non-moveable bearing surface extends for a distance less than the width of the filter chamber.

8. The air treatment device of claim 1, wherein the non-moveable bearing surface is centered on the second side.

9. The air treatment device of claim 1, wherein a second bearing surface is integrally formed with the first body.

10. The air treatment device of claim 9, wherein first body defines an inner face facing the flange and an exterior face opposite the inner face, the terminal edge being disposed between the inner and outer faces, and further wherein at least one of the inner and outer faces comprises the second bearing surface.

11. The air treatment device of claim 1, wherein the bearing surface is formed by a rigid, non-moveable second body associated with the framework, the second body extending inwardly relative to the framework opposite the first body.

12. The air treatment device of claim 11, wherein the first body is a latch extending from the first side and having a width less than a corresponding dimension of the first side of the framework.

13. The air treatment device of claim 12, wherein the framework further defines a second side opposite the first side, and further wherein the second body is a convex protrusion extending longitudinally toward the back end beyond the terminal edge of the latch.

14. The air treatment device of claim 13, wherein the convex protrusion defines a width that is less than a corresponding dimension of the second side.

15. The air treatment device of claim 14, wherein the latch is centered relative to the first side of the framework and the convex protrusion is centered relative to the second side.

16. The air treatment device of claim 12, wherein the filter retaining mechanism further includes a second rigid latch permanently extending inwardly relative to the frame opposite the first body latch, and further wherein the first and second latches combine to define the chamber access opening.

17. The air treatment device of claim 12, wherein the filter retaining mechanism further includes:
finger recesses formed in the framework.

18. The air treatment device of claim 12, wherein the housing defines an upright orientation such that the framework has a top and a bottom, and further wherein the first body extends from the top and the second body extends from the bottom.

19. The air treatment device of claim 11, wherein the first body includes interior and exterior faces extending in opposite directions from the terminal edge, and further wherein the first body tapers in height from the terminal edge along the interior face and along the exterior face.

20. The air treatment device of claim 19, wherein transition of the first body from the exterior face to the terminal edge defines an entrance guide surface for guiding a filter assembly along the first body.

21. The air treatment device of claim 20, wherein transition of the first body from the interior face to the terminal edge defines an exit guide surface for guiding a filter assembly along the first body.

22. The air treatment device of claim 19, wherein the first body has a convex profile in transverse cross-section.

23. The air treatment device of claim 19, wherein the first body has a triangular-like profile in transverse cross-section.

24. The air treatment device of claim 19, wherein the first and second bodies have an identical construction.

25. The air treatment device of claim 19, wherein the second body defines a terminal edge disposed between exterior and interior faces of the second body, and further wherein the second body tapers in height from the terminal edge along each of the corresponding exterior and interior faces.

26. The air treatment device of claim 25, wherein the chamber access opening is collectively defined by the terminal edges of the first and second bodies and the framework.

27. The air treatment device of claim 11, wherein the first and second bodies inwardly extend an identical distance from the corresponding side.

28. A portable air treatment system comprising: a filter assembly defining a filter height and a filter width in a natural state and being primarily non-permanently deflectable to a deflected state; and
a portable air treatment device comprising:
a blower;
a housing maintaining the blower and forming a filter chamber that is fluidly open to the blower, the filter chamber generally defined by an access end and a back end opposite the access end, wherein the filter chamber has height, width and depth dimensions, is sized to selectively receive the filter assembly and is defined at least in part by: framework extending from the access end to the back end to establish a maximum height and maximum width of the filter chamber,
a flange projecting inwardly relative to the framework at the back end, the flange providing a filter receiving surface and establishing a maximum depth of the filter chamber as a distance between the flange and the access end, and
a filter retaining mechanism for capturing the filter assembly within the filter chamber, the filter retaining mechanism including:
a rigid, non-moveable first body associated with the framework, the body being spaced from the back end and extending inwardly relative to the framework in one of the height and width dimensions to a terminal edge, wherein the terminal edge combines with the framework to create a chamber access opening having an effective height and an effective width, and even further wherein the terminal edge combines with the flange to establish an effective depth that is less than the maximum depth of the filter chamber, a non-moveable bearing surface associated with the first body.
wherein the maximum height and width of the filter chamber are greater than the corresponding filter height and filter width of the filter assembly, and at least one of the effective height and effective width of the chamber access opening is less than the corresponding filter height and filter width, and further wherein the filter assembly and the air treatment device are configured such that the filter assembly is insertable into the chamber by primarily non-permanently deflecting the filter assembly at the bearing surface to provide clearance about the terminal edge and is captured within the chamber between the first body and the flange.

29. The system of claim 28, wherein the effective width of the access opening is less than the filter width of the filter assembly.

30. The system of claim 28, wherein the effective height of the access opening height is less than the filter height of the filter assembly.

* * * * *